US012517996B2

(12) United States Patent
Stockley et al.

(10) Patent No.: US 12,517,996 B2
(45) Date of Patent: Jan. 6, 2026

(54) SYSTEMS AND METHODS FOR DETERMINING DOCUMENT AUTHENTICITY BASED ON WEIGHTED ANALYSIS OF CATEGORICAL CONTENT ATTRIBUTES

(71) Applicant: Capital One Services, LLC, McLean, VA (US)

(72) Inventors: Kimberly Stockley, Washington, DC (US); Dexter Ferguson, Catonsville, MD (US); Shannon Yogerst, New York, NY (US); Claire M. Rowlett, Washington, DC (US); Tyler Maiman, Melville, NY (US); Leeyat Bracha Tessler, Arlington, VA (US); Bryant Yee, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 136 days.

(21) Appl. No.: 18/497,786

(22) Filed: Oct. 30, 2023

(65) Prior Publication Data
US 2025/0139220 A1 May 1, 2025

(51) Int. Cl.
*G06F 21/44* (2013.01)
*G06F 21/62* (2013.01)
*H04L 9/40* (2022.01)

(52) U.S. Cl.
CPC .......... *G06F 21/44* (2013.01); *G06F 21/6245* (2013.01); *H04L 63/105* (2013.01)

(58) Field of Classification Search
CPC ..... G06F 21/44; G06F 21/6245; H04L 63/105
See application file for complete search history.

(56) References Cited

U.S. PATENT DOCUMENTS

| | | | |
|---|---|---|---|
| 9,210,216 B2 * | 12/2015 | Roy | H04L 67/104 |
| 9,754,200 B2 * | 9/2017 | Marinkin | G09F 3/0292 |
| 10,686,966 B1 * | 6/2020 | Becerra | H04N 1/00411 |
| 10,909,349 B1 * | 2/2021 | Tripathi | G06T 19/00 |
| 11,263,382 B1 * | 3/2022 | Sharzer | G16H 10/60 |
| 11,507,784 B2 * | 11/2022 | Finnie | G06F 18/2433 |
| 11,593,330 B1 * | 2/2023 | Serio | G06F 40/186 |
| 11,615,070 B2 * | 3/2023 | Nilsson | G06F 16/2255 |
| | | | 707/690 |
| 11,836,816 B1 * | 12/2023 | Serio | G06Q 50/16 |
| 12,165,424 B2 * | 12/2024 | Peng | G06V 10/758 |
| 12,244,593 B2 * | 3/2025 | Singh | H04L 63/20 |
| 12,278,829 B2 * | 4/2025 | Toutain | H04L 63/1416 |
| 2007/0027931 A1 * | 2/2007 | Heckenbach | G06Q 30/06 |

(Continued)

FOREIGN PATENT DOCUMENTS

CN 111539728 A * 8/2020 ............. G06Q 40/02

*Primary Examiner* — David Garcia Cervetti
(74) *Attorney, Agent, or Firm* — Foley & Lardner LLP

(57) ABSTRACT

Systems and methods are described herein for novel uses and/or improvements to artificial intelligence applications. As one example, systems and methods are described for the use of an artificial intelligence-based solution in identifying fraudulent documents and/or other content. In particular, the systems and methods adapt the artificial intelligence-based solution to overcome the technical problem of insufficient training data and/or solutions that are commensurate with the time frame and resources available.

18 Claims, 4 Drawing Sheets

(56) References Cited

U.S. PATENT DOCUMENTS

| | | | | |
|---|---|---|---|---|
| 2011/0264459 | A1* | 10/2011 | Tyler | G06Q 30/0185 |
| | | | | 707/E17.014 |
| 2013/0067546 | A1* | 3/2013 | Thavasi | G06F 21/31 |
| | | | | 726/7 |
| 2014/0263615 | A1* | 9/2014 | Deangelo | G07D 7/0043 |
| | | | | 235/375 |
| 2015/0169638 | A1* | 6/2015 | Jaber | G06F 16/5854 |
| | | | | 707/749 |
| 2015/0269593 | A1* | 9/2015 | Le | G06Q 10/087 |
| | | | | 705/2 |
| 2015/0278224 | A1* | 10/2015 | Jaber | G06F 16/583 |
| | | | | 707/758 |
| 2016/0012506 | A1* | 1/2016 | Ganti | H04W 4/029 |
| | | | | 705/26.41 |
| 2016/0044126 | A1* | 2/2016 | Mahadevan | H04L 67/10 |
| | | | | 709/213 |
| 2016/0239934 | A1* | 8/2016 | Soborski | G06F 21/44 |
| 2016/0337691 | A1* | 11/2016 | Prasad | H04N 21/812 |
| 2017/0091611 | A1* | 3/2017 | Soborski | H04L 9/3247 |
| 2017/0262680 | A1* | 9/2017 | Voigt | G06F 18/23 |
| 2019/0318354 | A1* | 10/2019 | Weinflash | G06Q 20/14 |
| 2021/0201423 | A1* | 7/2021 | Speranza | G06Q 10/10 |
| 2022/0060337 | A1* | 2/2022 | Castinado | H04L 9/3231 |
| 2022/0101547 | A1* | 3/2022 | Kang | G06T 5/70 |
| 2022/0398330 | A1* | 12/2022 | Castinado | G06F 21/6209 |
| 2024/0403460 | A1* | 12/2024 | Castinado | G06F 21/6209 |

* cited by examiner

SYSTEMS AND METHODS FOR DETERMINING DOCUMENT AUTHENTICITY BASED ON WEIGHTED ANALYSIS OF CATEGORICAL CONTENT ATTRIBUTES

BACKGROUND

Fraud schemes may come in many varieties. One such fraud scheme, an advance fee or payment fee scam, involves contacting a victim via letter, email, instant messaging, and/or social media using a fake email address or other credentials and requesting payment. In cybersecurity, one type of corresponding fraud is a phishing attack, which is a type of cyberattack in which the attacker poses as a legitimate entity, often through email, text messages, or other forms of communication, to deceive individuals into revealing sensitive information, such as log-in credentials, financial information, personal details, and/or otherwise obtaining payment. Fraud schemes such as phishing attacks often rely on fake credentials to deceive a victim into believing that information included in a document or other content is legitimate. In many cases, the document or other content may include legitimate elements (e.g., a victim's name and address, a company's logo, a company's website, etc.) mixed with illegitimate elements (e.g., a fraudulent wiring address, a fraudulent telephone number, etc.). Given the mixing of these elements as well as the likely plurality of potential legitimate elements (e.g., a company may have multiple telephone numbers, addresses, collection departments, etc.), it is often difficult to determine a legitimate document from a fraudulent one.

In recent years, the use of artificial intelligence, including, but not limited to, machine learning, deep learning, etc. (referred to collectively herein as "artificial intelligence models," "machine learning models," or simply "models") has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence may rely on large amounts of high-quality data. The process for obtaining this data and ensuring it is high-quality can be complex and time consuming.

This technical problem presents an inherent problem with attempting to use an artificial intelligence-based solution in identifying fraudulent documents, as described above. For example, any artificial intelligence solution first needs to be able to detect patterns used to determine a fraud. Such a determination requires copious amounts of training data that may distinguish between a legitimate and illegitimate document. However, as illegitimate documents may include numerous legitimate elements (e.g., legitimate logos, letterheads, etc.), pattern detection that relies on such elements is limited in its ability to distinguish between legitimate and illegitimate documents.

Second, any artificial intelligence solution needs to be able to be applied in a time frame and using resources that are commensurate with its application. For example, with respect to fraudulent documents received by traditional mail or email, a victim likely needs to be able to determine their authenticity at the time of receipt (e.g., to determine whether to pay, discard, report, etc.) and make that determination with resources immediately available on hand at the time of receipt. However, despite the mainstream popularity of artificial intelligence, practical implementations of artificial intelligence may require specialized knowledge to design, program, and integrate artificial intelligence-based solutions, which can limit the number of people and resources available to create these practical implementations as well as the usable implementations that are available.

SUMMARY

Systems and methods are described herein for novel uses and/or improvements to artificial intelligence applications. As one example, systems and methods are described herein for the use of an artificial intelligence-based solution in identifying fraudulent documents and/or other content. In particular, the systems and methods adapt the artificial intelligence-based solution to overcome the technical problem of insufficient training data and/or solutions that are commensurate with the time frame and resources available.

In order to overcome the technical problem of insufficient training data, the system detects legitimate or illegitimate content using patterns of attributes (e.g., logos, names, addresses, etc.). However, as some of the attributes may be illegitimate, the system may weigh these attributes based on whether each attribute may be verified through public or private information. For example, an attribute that is verified using privately available information may be weighed more heavily than an attribute that is verified using publicly available information. Moreover, in order to allow for real-time determinations and using resources likely available to a user, the system may perform the verification using image analysis of the content.

In some aspects, systems and methods are described for determining content authenticity based on weighted analysis of categorical attributes. For example, the system may receive first content, wherein the first content comprises a plurality of attributes corresponding to a user. The system may determine, using a first model, a first attribute of the plurality of attributes in the first content. The system may determine whether the first attribute corresponds to a first data category or a second data category, wherein the first data category is inaccessible via a public data source and wherein the second data category is accessible via the public data source. The system may, in response to determining that the first attribute corresponds to the first data category, retrieve a first set of data corresponding to the user from a private data source. The system may generate a first comparison of the first attribute and the first set of data. The system may determine a first weight for the first comparison based on the first comparison involving the first set of data. The system may generate an assessment of authenticity of the first content based on the first weight and a first result of the first comparison. The system may generate a notification for display on a user device, wherein the notification comprises the assessment.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
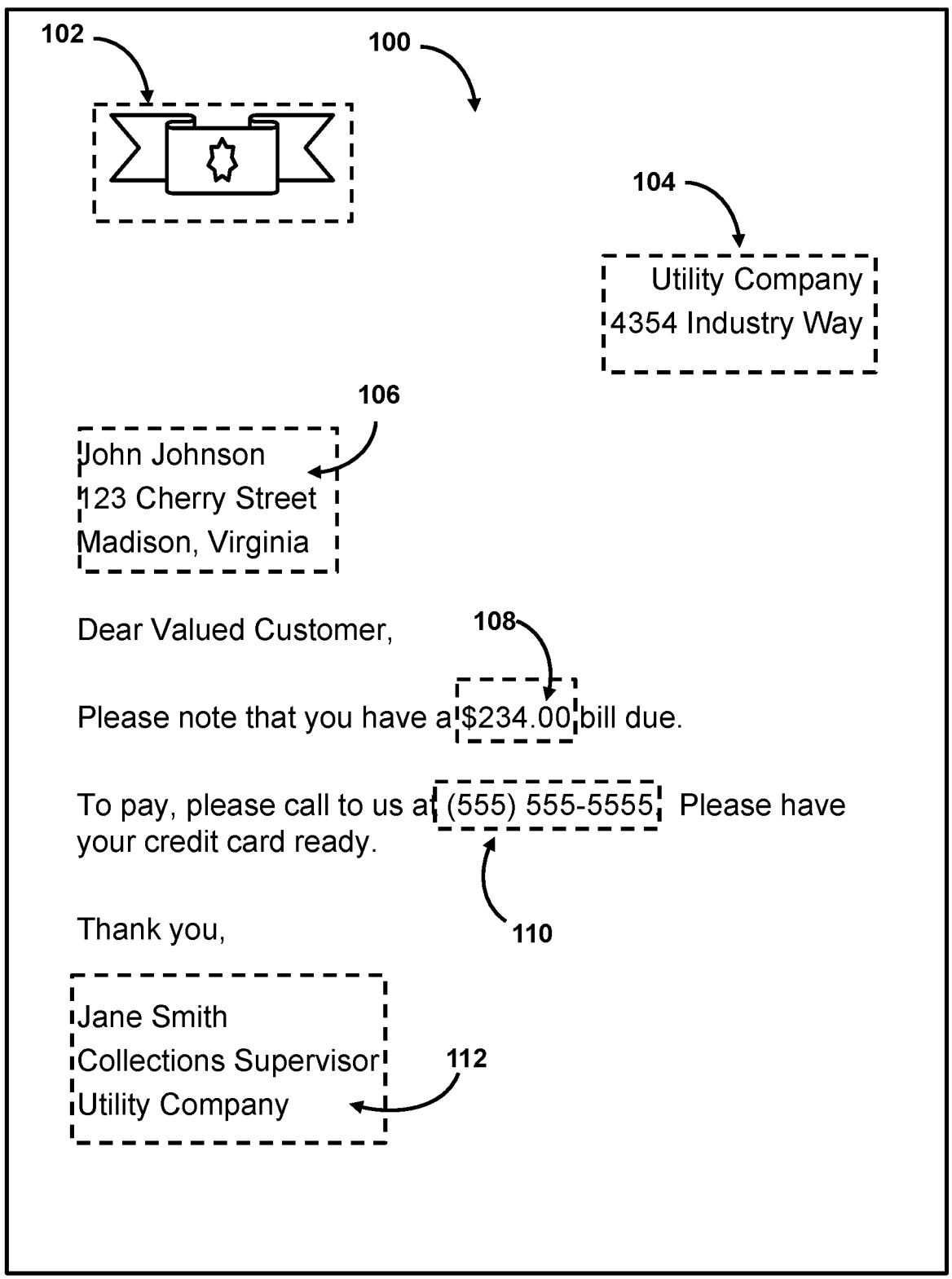
FIG. 1 shows an illustrative example of content for determining its authenticity, in accordance with one or more embodiments.

FIG. 1 shows an illustrative example of content for determining its authenticity, in accordance with one or more embodiments. For example, systems and methods are described herein for the use of an artificial intelligence-based solution in identifying fraudulent documents and/or other content. FIG. 1 includes document 100, which may correspond to a physical artifact such as an object or other document (e.g., a letter, printed email, etc.). For example, in some embodiments, document 100 may comprise any recorded or written representation of information, ideas, facts, or thoughts that is intended to communicate knowledge or serve as a reference. For example, document 100 may take various forms and formats, both physical and digital. For example, document 100 may comprise content presented in a user interface. As referred to herein, a "user interface" may comprise a human-computer interaction and communication in a device and may include display screens, keyboards, a mouse, and the appearance of a desktop. For example, a user interface may comprise a way a user interacts with an application or a website.

In some embodiments, document 100 may comprise any content. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices but can also be part of a live performance. Furthermore, user generated content may include content created and/or consumed by a user. For example, user generated content may include content created by another but consumed and/or published by the user.

In order to overcome the technical problem of insufficient training data, the system may detect legitimate or illegitimate content using patterns of attributes (e.g., logos, names, addresses, etc.). Illegitimate content may refer to digital or physical materials that are considered improper, unauthorized, or unlawful in nature. This content (or its use) may violate ethical, legal, or societal standards, and it is often deemed unacceptable for public consumption due to its harmful, offensive, or deceptive nature. Illegitimate content can encompass a wide range of forms, including text, images, audio, video, and interactive media. In contrast, legitimate content may refer to digital or physical materials that conform to ethical, legal, and societal standards. This type of content is authorized, acceptable, and appropriate for public consumption and is often considered valuable, informative, or entertaining. Legitimate content contributes positively to various fields, such as education, entertainment, research, journalism, and communication, while adhering to laws, regulations, and ethical guidelines. Given content may include both legitimate and/or illegitimate content.

As some of the attributes may be illegitimate, the system may weigh these attributes based on whether each attribute may be verified through public or private information. For example, an attribute that is verified using privately available information may be weighed more heavily than an attribute that is verified using publicly available information. Publicly available information may refer to data, facts, records, and materials that are accessible to the general public without the need for specific permissions, subscriptions, and/or credentials. For example, this information may be open for anyone to view, use, and share, and it can be obtained from various sources, including government agencies, public institutions, publications, websites, and public records. In contrast, private information, also known as personal information or sensitive information, refers to data that is confidential and not intended for public disclosure. This type of information is considered private because it pertains to an individual's personal life, identity, or activities and is not meant to be shared indiscriminately. Private information can be used to identify or trace an individual, and its exposure can lead to privacy breaches, identity theft, and other negative consequences.

Content in document 100 may include a plurality of attributes. For example, document 100 may include logo 102, letterhead 104, user name and address 106, user account details 108, contact information 110, and/or company contact 112. The system may determine whether one or more of these attributes is legitimate and/or illegitimate to provide a recommendation as to the authenticity of document 100. For example, authenticity may refer to the quality or state of being genuine, real, and/or true.

In some embodiments, the system may compare attributes to publicly available information (e.g., available via public sources) and/or privately available information (e.g., available via non-public and/or private sources). In some embodiments, the sources may include user profiles about a given user. For example, the system may monitor content generated by a user, determined to relate to a user, and/or other stored about a user to generate user profile data. As referred to herein, "a user profile" and/or "user profile data" may comprise data actively and/or passively collected about a user. For example, the user profile data may comprise content generated by the user and a user characteristic for the user. A user profile may be content consumed and/or created by a user.

User profile data may also include a user characteristic. As referred to herein, "a user characteristic" may include info about a user and/or information included in a directory of stored user settings, preferences, and information for the user. For example, a user profile may have the settings for the user's installed programs and operating system. In some embodiments, the user profile may be a visual display of personal data associated with a specific user or a customized desktop environment. In some embodiments, the user profile may be a digital representation of a person's identity. The data in the user profile may be generated based on the system's active or passive monitoring. In some embodiments, the system may compare one or more user characteristics (e.g., a known address, account balance, and/or other information) to determine the authenticity of content.

The system may weigh attributes (or results of comparisons) in content based on comparisons to public and/or private data. Weighing or assigning different levels of importance to variables in computations is often necessary to reflect the relative significance of those variables in a given context.

Figure 2:
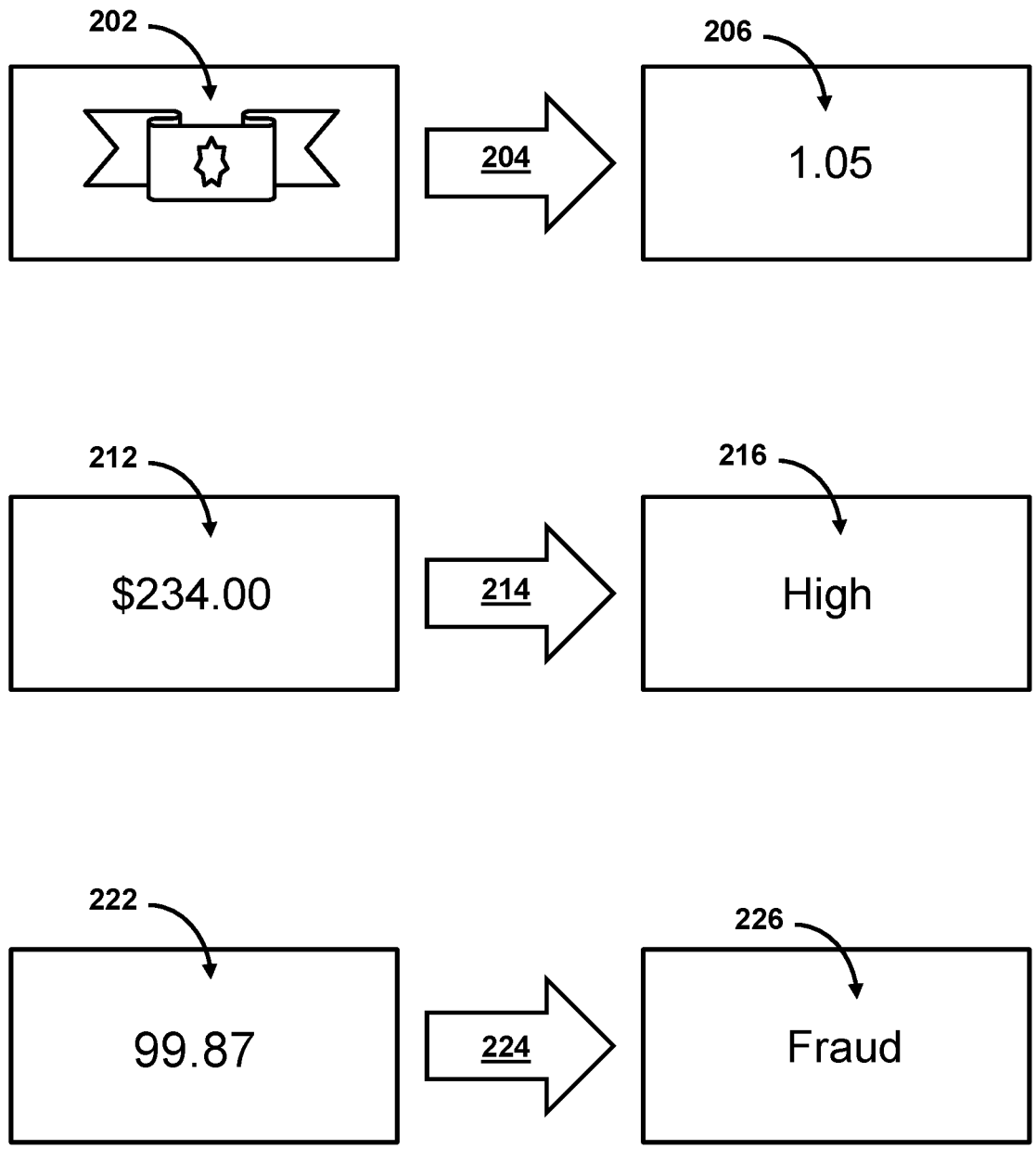
FIG. 2 shows an illustrative diagram for determining content authenticity based on weighted analysis of categorical image attributes, in accordance with one or more embodiments.

FIG. 2 shows an illustrative diagram for determining content authenticity based on weighted analysis of categorical image attributes, in accordance with one or more embodiments. As shown in FIG. 2, the system may detect an attribute (e.g., logo 202) in a document. For example, the system may detect the attribute using image analysis. Image analysis, a subset of computer vision, involves processing and interpreting visual information from images or videos. To perform the image analysis, the system may obtain digital images or video frames using cameras, sensors, or other imaging devices. The system may clean and/or enhance the images to improve their quality and suitability for analysis. This can involve tasks such as noise reduction, image denoising, and image enhancement. The system may then divide the image into meaningful regions or objects (e.g., about an attribute). This can involve separating objects from the background or segmenting different parts of an image based on specific criteria. The system may identify and extract relevant features or characteristics from the segmented regions. Features can include shapes, textures, colors, edges, and more. The system may then identify and localize specific objects or patterns of interest within an image. This can involve techniques like template matching, machine learning-based object detection, and deep learning. The system may assign objects or regions to specific categories or classes based on their features. Machine learning algorithms, such as support vector machines or neural networks, are often used for classification tasks.

The attribute may then compare logo 202 using process 204 to one or more data sources. Based on the comparison, the system may generate a score (e.g., score 206) indicating how closely the logo corresponds to a known logo. Score 206 may then be weighed according to a category to which logo 202 belongs and/or to a category of data against which logo 202 was compared. For example, the system may assign objects or regions to specific categories or classes based on their features.

In some embodiments, the system may use machine learning algorithms, such as support vector machines or neural networks, or other models for classification tasks. For example, the system may perform comparisons by using comparison operators and algorithms to evaluate the relationship between values, expressions, or datasets related to attributes. Based on the comparisons (or results thereof), the system may make decisions, filter data, sort arrays, etc. The system may then determine whether a specific relationship between values is true or false.

Alternatively or additionally, the system may determine a confidence metric. For example, a confidence metric may be a measure used to quantify the level of certainty or reliability associated with a particular result, prediction, or decision made by a system, algorithm, or model. The determination of a confidence metric depends on the specific context and the method being used. Confidence metrics are commonly used in various fields, including machine learning, artificial intelligence, data analysis, and decision-making.

As shown in FIG. 2, the system may use process 214 to determine a confidence metric (e.g., metric 216) that data 212 corresponds to known user account information. To determine the confidence metric, the system may select a confidence interval. A confidence interval is a range of values around a sample statistic (e.g., sample mean or proportion) within which the true population parameter is likely to fall. The choice of confidence interval depends on your desired level of confidence. Common choices include 90%, 95%, and 99% confidence intervals. To calculate a confidence interval, the system may need the sample statistic, the sample size, and the variability of the data. The formula varies depending on whether the system is estimating a population mean, proportion, or other parameter. The system may find a critical value. For example, the critical values (t or z) correspond to the chosen confidence level and degrees of freedom. The system may use the critical value to calculate the range that defines the confidence interval. The confidence interval may be centered around the sample statistic (e.g., mean or proportion) and will extend above and below it by a certain margin. The resulting confidence interval may provide a range of values within which the system can be confident the true population parameter lies given the chosen confidence level.

The system may then aggregate score 222 (and scores for other attributes) using process 224 to determine whether or not the content is authentic. The system may then generate an assessment (e.g., assessment 226) as to the authenticity of the content. For example, the system aggregates weighted values by calculating a weighted sum or average of the individual values, where each value is multiplied by its corresponding weight before being combined.

For example, the system may gather the individual values (e.g., score 206) and their corresponding weights. These weights can represent the importance, relevance, or contribution of each value to the final aggregate. The system may multiply each value by its corresponding weight to get the weighted value for each item. This step emphasizes the significance of certain values over others. The system may then use a weighted sum and/or weighted average. The system may then interpret the results. For example, the resulting aggregated value represents the combined influence of the individual values, considering their assigned weights.

Figure 3:
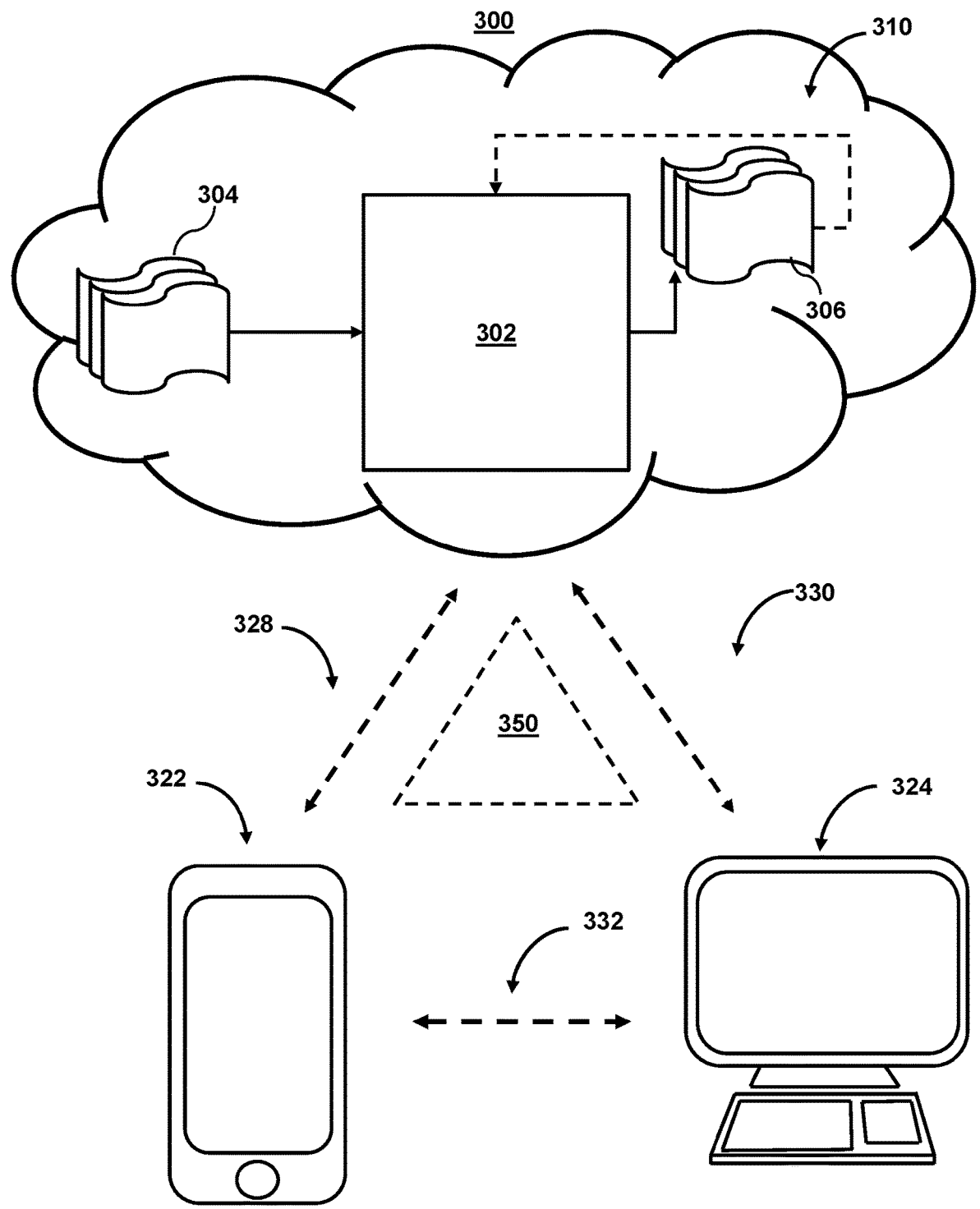
FIG. 3 shows illustrative components for a system used to determine content authenticity, in accordance with one or more embodiments.

FIG. 3 shows illustrative components for a system used to determine content authenticity, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a handheld computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as a touchscreen smartphone and personal computer, respectively, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include one or more data sources (e.g., public or private). Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., whether an attribute corresponds to data from a data source).

In some embodiments, the system may use fuzzy matching. Fuzzy matching is a technique used in text and string comparison to identify and match strings that are similar or partially similar, even when they contain variations, typos, misspellings, or minor differences. Unlike exact string matching, which requires an exact match of characters, fuzzy matching allows for some degree of similarity, allowing the system to handle data that might be imprecise or contain errors.

In some embodiments, the system may use one or more matching algorithms such as Levenshtein distance (e.g., which measures the minimum number of single-character edits (insertions, deletions, substitutions) required to transform one string into another), Jaro-Winkler distance (e.g., which considers both the number of matching characters and the transpositions of characters), cosine similarity (e.g., which is used for comparing documents or text by representing them as vectors and calculating the cosine of the angle between them), soundex and metaphone (e.g., which are phonetic algorithms that encode words based on their pronunciation, allowing for phonetic matches), N-gram matching (e.g., which breaks strings into smaller fragments (n-grams) and calculates the similarity based on the overlap of these fragments), etc.

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302, where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a determination of authenticity, determining a weight, and/or determining a result of a comparison).

In some embodiments, the model (e.g., model 302) may automatically perform actions based on outputs 306. In some embodiments, the model (e.g., model 302) may not perform any actions. The output of the model (e.g., model 302) may be used to generate a determination of authenticity, determining a weight, and/or determining a result of a comparison.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of their operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications is in place.

In some embodiments, the system architecture may use a microservice approach. Such systems may use two types of layers: Front-End Layer and Back-End Layer, where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
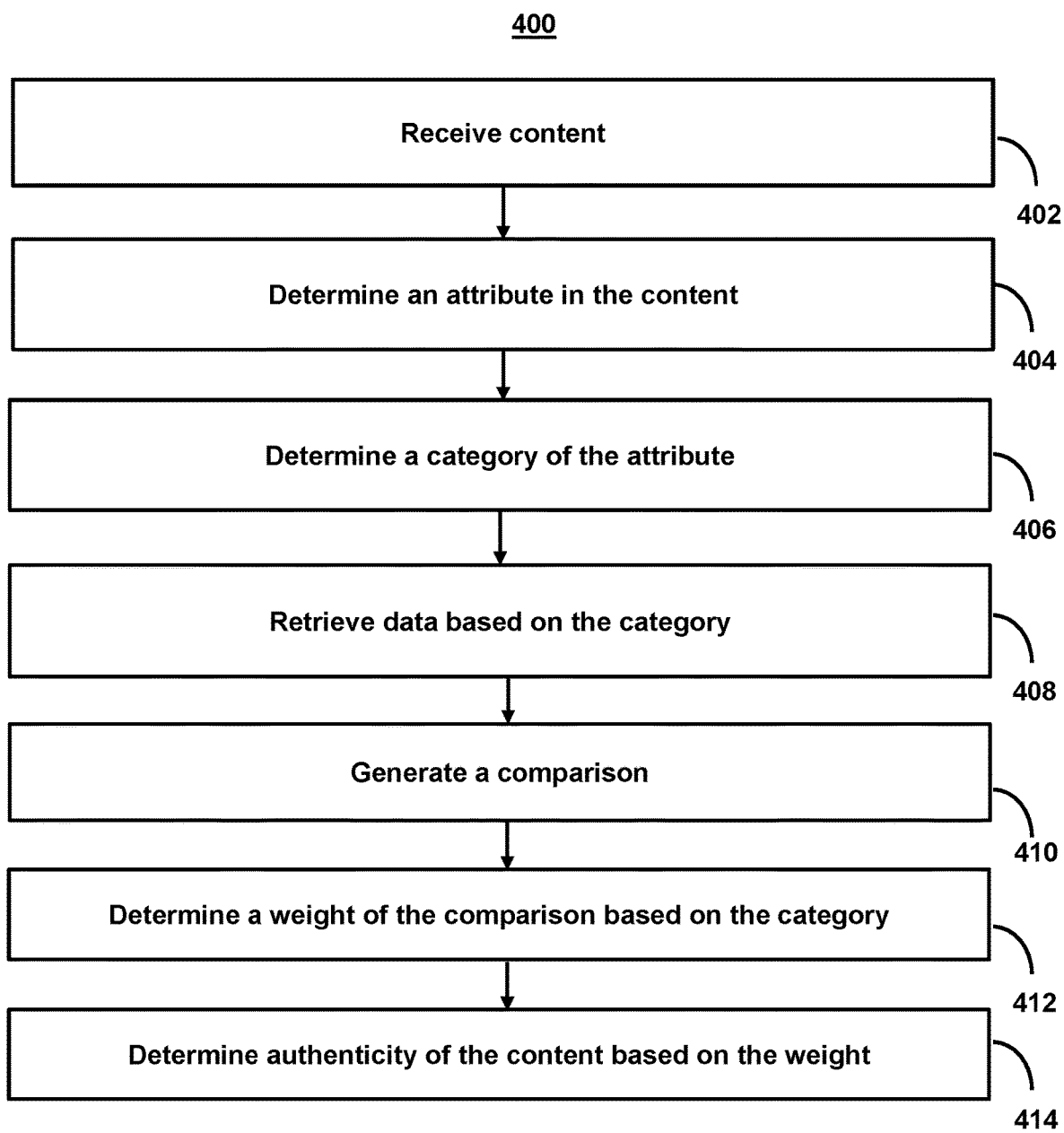
FIG. 4 shows a flowchart of the steps involved in determining content authenticity, in accordance with one or more embodiments.

FIG. 4 shows a flowchart of the steps involved in determining content authenticity, in accordance with one or more embodiments. For example, the system may use process 400 (e.g., as implemented on one or more system components described above) in order to determine content authenticity based on weighted analysis of categorical attributes.

At step 402, process 400 (e.g., using one or more components described above) receives content. For example, the system may receive first content, wherein the first content comprises a plurality of attributes corresponding to a user. As one example, the system may receive an image, wherein the image comprises a two-dimensional representation of a physical artifact, wherein the physical artifact comprises a plurality of attributes corresponding to a user. For example, a user may receive an invoice in the mail. The user can take a picture of the bill and provide it to the system. The system may receive an image of the bill (e.g., the physical asset) that the user uploads. The bill can include information such as address, company name, recipient name, and amount (e.g., attributes) corresponding to the user.

At step 404, process 400 (e.g., using one or more components described above) determines an attribute in the content. For example, the system may determine, using a first model, a first attribute of the plurality of attributes in the first content. As one example, the system may determine a first attribute of the plurality of attributes in the image, wherein the first attribute comprises information that is used for validating authenticity of the image. In some embodiments, the system can prioritize the attributes included in the bill. For example, the attributes can include the sender's address, the company name and logo, the account number, the amount due, the payment method, the contact information, and the text in the asset (e.g., grammar and tone). For example, the system may prioritize a mismatched logo over a misspelled name, as it is more likely that the name was mistyped, whereas the logo is more likely copied from another source.

At step 406, process 400 (e.g., using one or more components described above) determines a category of the attribute. For example, the system may determine whether the first attribute corresponds to a first data category or a second data category, wherein the first data category is inaccessible via a public data source and wherein the second data category is accessible via the public data source. For example, the system can determine a first category corresponding to the attributes, such as confidential information. For example, the confidential information may only be accessible non-public data sources (e.g., employee numbers, account number, billing amount, or payment history). Additionally, the system may determine another category, such as non-confidential information. For example, the non-confidential information may be accessible through one or more public data sources (e.g., company name, logo and address, contact information, payment instructions, links to terms and conditions or privacy policies, or billing cycle dates).

In some embodiments, the system may use other categories of data and/or other data sources and/or perform comparisons based on attributes not found directly in the content. Additionally or alternatively, the system may generate searches for specific data. For example, the system may identify an online identifier in the plurality of attributes corresponding to the user, wherein the online identifier corresponds to digital content. The system may generate a plurality of extracted attributes by accessing the digital content pointed to by the online identifier corresponding to the first attribute. The system may compare each attribute of the plurality of extracted attributes to the first attribute. The system may then update an assessment when at least one of the plurality of extracted attributes matches the first attribute.

For example, the system may be able to extract a URL (e.g., identifier). Using the URL, the system can compare the URL to databases with known fraudulent, phishing, or scam URLs and use this information to inform the confidence metric. Furthermore, the system can use the URL and perform additional analysis. For example, the system can use a screenshot of a billing page on a website as another image to analyze.

At step 408, process 400 (e.g., using one or more components described above) retrieves data based on the category. For example, the system may, in response to determining that the first attribute corresponds to the first data category, retrieve a first set of data corresponding to the user from a private data source. In some embodiments, the system may determine a first set of data corresponding to a private data source and/or determine a second set of data corresponding to the public data source. For example, based on the first category (e.g., confidential information), the system may retrieve a first subset of the confidential information the system retrieved. For example, if the system is trying to validate a user's customer ID, the system may retrieve a confidential list including a list of customer IDs. The system may further refine the retrieved set of confidential data by cross-referencing the information with one or more of the attributes corresponding to the user included in the image. In contrast, based on the second category (e.g., non-confidential information), the system may determine a second subset of the non-confidential information the system retrieved. For example, if the system is trying to validate a company logo, the system may retrieve a set of vectors or images with logos corresponding to the name of the company on the image. The system may further refine the retrieved set of confidential data by cross-referencing the information with one or more of the attributes corresponding to the user included in the image.

At step 410, process 400 (e.g., using one or more components described above) generates a comparison. For example, the system may generate a first comparison of the first attribute and the first set of data. As one example, the system may generate an assessment of image authenticity based on generating a verification of the first attribute based on the first set of data or the second set of data and determining a weight for the verification based on whether the first attribute was verified against the first set of data or the second set of data, wherein verifications based on the first set of data have a first weight and verifications based on the second set of data have a second weight. In some embodiments, the system may generate a confidence metric for the assessment based on the weight and the verification.

At step 412, process 400 (e.g., using one or more components described above) determines a weight of the comparison based on the category. For example, the system may determine a first weight for the first comparison based on the first comparison involving the first set of data.

In some embodiments, the system may determine a weight based on a length of time required to access data (e.g., whether due to the amount of data, the systems involved, the difficulty in obtaining data, etc.). For example, the system may determine a first length of time required to access the first set of data. The system may then generate the first weight based on the first length of time. For example, if a first subset is a list of account numbers that are not publicly available and the attribute is an account number, the system can generate a weight corresponding to confidential information, which would likely be higher than a weight corresponding to information that is publicly accessible (e.g., a second weight). The weight may correspond to the difficulty of accessing the information or replicating the information. The weights may also correspond to the difficulty of fraudulently incorporating the information into an asset. For example, an account number may be harder for an attacker to obtain than a publicly available company logo. The confidence metric can be informed in part by the acquisition difficulty.

In some embodiments, the system may determine an authorization level required to access the data. The system may then determine the weight based on the authorization level. Authorization levels, also known as access levels or permissions, define the level of access and actions that a user or entity is allowed to perform on a system, application, or dataset. These levels ensure that only authorized individuals can access and manipulate specific data or resources, enhancing security and data integrity. Authorization levels are a fundamental part of access control mechanisms in information systems.

In some embodiments, the system may compare the private user data against publicly available data. For example, the system may generate a third comparison of the first attribute and the second set of data. The system may generate the first weight based on the third comparison. For example, the system may determine whether the private user data was disclosed in an unauthorized manner (e.g., via a data leak). A data leak, also referred to as a data breach, occurs when sensitive or confidential information is accessed, disclosed, or transmitted without proper authorization. This unauthorized exposure of data can happen due to various reasons, such as cyberattacks, human error, or system vulnerabilities. Data leaks can have significant consequences for individuals, organizations, and even society at large, as they can lead to identity theft, financial loss, reputational damage, and more.

In some embodiments, the system may determine that the first attribute is data confirmed by the user and generate the first weight based on determining that the first attribute is the data confirmed by the user. For example, the system may determine an attribute from the image is information provided by the user, such as an email. The system may retrieve a dataset of information (e.g., email addresses) shared by the user on other platforms tied by the user's name or other characteristic of the user. The system can determine an origin of the dataset and generate a weight and corresponding confidence metric based on the dataset.

In some embodiments, the system may determine an attribute from the image is information that is not readable to a human, such as a hashed password. For example, the system may determine that the first attribute is non-human-readable data and generate the first weight based on determining that the attribute is non-human-readable data. The system may retrieve a dataset of similar information (e.g., hashed passwords), determine an origin of the dataset, and generate a weight and corresponding confidence metric based on the dataset.

In some embodiments, the system may determine an attribute from the image is a two-dimensional code, such as a QR code on the bill for the user to scan to pay. The system may retrieve a dataset of similar information (e.g., a set of QR codes or other two-dimensional codes), determine an origin of the dataset, and generate a weight and corresponding confidence metric based on the dataset. For example, the system may determine that the first attribute is a two-dimensional code, wherein the two-dimensional code comprises a resource locator, and generate the first weight based on determining that the first attribute is the two-dimensional code.

In some embodiments, the system may determine that the first attribute is a form of contactless technology and generate the first weight based on determining that the first attribute is the form of contactless technology. For example, the system may determine that the attribute includes contactless technology, such as a code corresponding to an NFC tag. The system may retrieve a dataset of similar information (e.g., a set of NFC tags corresponding to the image), determine an origin of the dataset, and generate a weight and corresponding confidence metric based on the dataset.

In some embodiments, the system may determine that the attribute includes temporal data, such as a previous payment date. For example, the system may determine that the first attribute is temporal data, wherein the temporal data represents a point in time, and generate the first weight based on determining that the first attribute is the temporal data. The system may retrieve a dataset of similar information (e.g., data that is associated with a point in time). The system may determine an origin of the dataset (e.g., a date) and generate a weight and corresponding confidence metric based on the dataset. The system may assign a higher weight to a temporal attribute, as there are potentially more options for retrieving data as a time can be cross-referenced.

In some embodiments, the system may determine that the attribute includes non-temporal data, such as an address or account number. For example, the system may determine that the first attribute is non-temporal data, wherein the non-temporal data is data not associated with a point in time, and generate the first weight based on determining that the first attribute is the non-temporal data. The system may retrieve a dataset of similar information (e.g., data that is not associated with one or more points in time). The system may determine an origin of the dataset and generate a weight and corresponding confidence metric based on the dataset. The system may assign a lower weight, as there are potentially fewer options to verify, as the system cannot cross-reference databases based on temporal data.

In some embodiments, the system may identify particular portions of content to analyze. For example, the system may determine a portion of the first content using optical character recognition. The system may generate an authentication value corresponding to the portion. The system may retrieve an authentication dataset, wherein the authentication dataset comprises a plurality of authentication values corresponding to fraudulent content. The system may generate the first weight based on comparing the authentication value to the authentication dataset. For example, the system can use a set of pre-sorted (e.g., sorted into fraudulent and authentic) hashed images to determine the likelihood the image is fraudulent. The hash (i.e., authentication value) may be based on one or more portions of the image. For example, the system may identify, using OCR, an introductory paragraph as a first section and a logo as a second section and, based on a hashed value of the first section and the second section, be able to determine within a certain confidence that the image is fraudulent. Furthermore, the system may be able to determine if the image is fraudulent more effectively as more sections are hashed and compared to previously hashed fraudulent images.

In some embodiments, the system may compare multiple attributes in content to determine its authenticity. In such cases, the system may generate an aggregated score based on the plurality of comparison results (e.g., whether the results are positive, negative, or inconclusive) and the corresponding weights. For example, the system may determine a second attribute of the plurality of attributes in the first content. The system may, in response to determining that the second attribute corresponds to the second data category, retrieve a second set of data corresponding to the user from the public data source. The system may generate a second comparison of the second attribute and the second set of data. The system may determine a second weight for the second comparison based on the second comparison involving the second set of data, wherein the assessment of authenticity of the first content is further based on the second weight and a second result of the second comparison.

At step 414, process 400 (e.g., using one or more components described above) determines authenticity of the content based on the weight. For example, the system may generate an assessment of authenticity of the first content based on the first weight and a first result of the first comparison. For example, if the primary attribute is a customer address, the system can generate an assessment by comparing the customer address to a list of addresses associated with a customer that is available publicly and a list of addresses associated with a customer that is not available publicly. For example, the customer may have recently moved, and thus, public data sources are not as accurate as a more frequently updated private data source. The system can compare the customer's address (e.g., the attribute) to the two subsets and, if they match, generate an assessment indicating the address is genuine. If the address does not match addresses in the public or private subsets, the system may generate an assessment indicating the address is fraudulent.

In some embodiments, the system may determine a confidence metric based on the weight and/or include the confidence metric in the assessment and/or notification. The system can use the confidence metric to determine how likely the assessment is to be accurate. For example, it is more likely that the image is not authentic if there is an incorrect account number, as that is difficult for a bad actor to obtain versus a correct logo, which is publicly available, indicating an authentic image. In some embodiments, the weights (and/or the positive or negative results of a comparison) corresponding to the attributes can be combined to generate a confidence metric. The system can use the confidence metric to determine how likely the assessment is to be accurate. For example, it is more likely that the image is not authentic if there is an incorrect account number, as that is difficult for a bad actor to obtain versus a correct logo, which is publicly available, indicating an authentic image.

In some embodiments, the system may further compare the confidence metric to a threshold confidence metric. For example, the system may alert a user if the image is likely fraudulent as determined by the confidence metric generated by the system exceeding a predetermined confidence metric threshold. Based on this alert, the user may be presented with options, including the option to accept or reject the system's determination. Based on the user's response, the model may be updated to improve image categorization. Specifically, based on verification from the user that the bill is authentic or fraudulent, the system can improve the model (e.g., improve the determination accuracy) and store the image in a database of known fraudulent bills.

In some embodiments, the system may further generate a notification related to the assessment. For example, the system may generate a notification for display on a user device, wherein the notification comprises the assessment and/or a confidence metric. For example, the system may generate a notification to the user to inform them that the image of the physical asset is either fraudulent or not fraudulent. The notification can include the assessment as well as a confidence metric based on where the data used to generate the assessment was obtained (e.g., a government database may be more trustworthy than a list of emails associated with an email sign-up list).

In some embodiments, the notification may comprise a recommendation. For example, the system may provide a recommendation based on the assessment and the image. For example, if the system determines that an image is fraudulent with 80% confidence, the system may recommend calling a specified phone number (identified as an attribute in the image) or visiting a website associated with the logo identified by the system to garner additional information. For example, the system may generate a recommended action by retrieving a third set of data, wherein the third set of data comprises a plurality of actions and wherein each action of the plurality of actions in the third set of data corresponds to verifying the plurality of attributes and determining the recommended action of the plurality of actions corresponding to the first attribute.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for determining content authenticity based on weighted analysis of categorical attributes.
2. The method of any one of the preceding embodiments, the method comprising: receiving first content, wherein the first content comprises a plurality of attributes corresponding to a user; determining, using a first model, a first attribute of the plurality of attributes in the first content; determining whether the first attribute corresponds to a first data category or a second data category, wherein the first data category is inaccessible via a public data source, and wherein the second data category is accessible via the public data source; in response to determining that the first attribute corresponds to the first data category, retrieving a first set of data corresponding to the user from a private data source; generating a first comparison of the first attribute and the first set of data; determining a first weight for the first comparison based on the first comparison involving the first set of data; generating an assessment of authenticity of the first content based on the first weight and the first comparison; and generating a notification for display on a user device, wherein the notification comprises the assessment and a confidence metric.
3. The method of any one of the preceding embodiments, further comprising: determining a second attribute of the plurality of attributes in the first content; in response to determining that the second attribute corresponds to the second data category, retrieving a second set of data corresponding to the user from a public data source; generating a second comparison of the second attribute and the second set of data; and determining a second weight for the second comparison based on the second comparison involving the second set of data, wherein the assessment of authenticity of the first content is further based on the second weight and the second comparison.
4. The method of any one of the preceding embodiments, wherein determining the first weight further comprises: determining a first length of time required to access the first set of data; generating the first weight based on the first length of time.
5. The method of any one of the preceding embodiments, wherein determining the first weight further comprises: determining a first authorization level to access the first set of data; and generating the first weight based on the first authorization level.

6. The method of any one of the preceding embodiments, wherein determining the first weight further comprises: generating a third comparison of the first attribute and the second set of data; and generating the first weight based on the third comparison.
7. The method of any one of the preceding embodiments, wherein determining the first weight further comprises: determining that the first attribute is data confirmed by the user; and generating the first weight based on determining that the first attribute is the data confirmed by the user.
8. The method of any one of the preceding embodiments, wherein determining the first weight further comprises: determining that the first attribute is non-human-readable data; and generating the first weight based on determining that the first attribute is non-human-readable data.
9. The method of any one of the preceding embodiments, wherein determining the first weight further comprises: determining that the first attribute is a two-dimensional code, wherein the two-dimensional code comprises a resource locator; and generating the first weight based on determining that the first attribute is the two-dimensional code.
10. The method of any one of the preceding embodiments, wherein determining the first weight further comprises: determining that the first attribute is a form of contactless technology; and generating the first weight based on determining that the first attribute is the form of contactless technology.
11. The method of any one of the preceding embodiments, wherein determining the first weight further comprises: determining that the first attribute is temporal data, wherein the temporal data represents a point in time; and generating the first weight based on determining that the first attribute is the temporal data.
12. The method of any one of the preceding embodiments, wherein determining the first weight further comprises: determining that the first attribute is non-temporal data, wherein the non-temporal data is data not associated with a point in time; and generating the first weight based on determining that the first attribute is the non-temporal data.
13. The method of any one of the preceding embodiments, wherein generating the confidence metric further comprises: determining a portion of the first content using optical character recognition; generating an authentication value corresponding to the portion; retrieving an authentication dataset, wherein the authentication dataset comprises a plurality of authentication values corresponding to fraudulent content; and generating the first weight based on comparing the authentication value to the authentication dataset.
14. The method of any one of the preceding embodiments, wherein generating the assessment further comprises: generating a confidence metric based on the first weight; and providing the confidence metric in the assessment.
15. The method of any one of the preceding embodiments, further comprising: determining a threshold confidence metric; transmitting an alert to the user device when the confidence metric exceeds the threshold confidence metric.
16. The method of any one of the preceding embodiments, further comprising: identifying an online identifier in the plurality of attributes corresponding to the user, wherein the online identifier corresponds to digital content; generating a plurality of extracted attributes by accessing the digital content pointed to by the online identifier corresponding to the first attribute; comparing each attribute of the plurality of extracted attributes to the first attribute; and updating the assessment when at least one of the plurality of extracted attributes matches the first attribute.
17. The method of any one of the preceding embodiments, further comprising: generating a recommended action by: retrieving a third set of data, wherein the third set of data comprises a plurality of actions, and wherein each action of the plurality of actions in the third set of data corresponds to verifying the plurality of attributes; and determining the recommended action of the plurality of actions corresponding to the first attribute.
18. One or more non-transitory, computer-readable mediums storing instructions that, when executed by a data processing apparatus, cause the data processing apparatus to perform operations comprising those of any of embodiments 1-17.
19. A system comprising one or more processors; and memory storing instructions that, when executed by the processors, cause the processors to effectuate operations comprising those of any of embodiments 1-17.
20. A system comprising means for performing any of embodiments 1-17.

What is claimed is:
1. An artificial intelligence-based system for determining content authenticity based on weighted analysis of categorical attributes with limited training data, the system comprising:
one or more processors; and
a non-transitory, computer-readable medium having instructions recorded thereon that, when executed by the one or more processors, cause operations comprising:
receiving an image, wherein the image comprises a two-dimensional representation of a physical artifact, wherein the physical artifact comprises a plurality of attributes corresponding to a user;
determining, using a first machine learning model, a first attribute and a second attribute of the plurality of attributes in the image, wherein the first attribute and the second attribute comprises information that is used for validating authenticity of the image, wherein the first machine learning model is configured to generate verifications for individual attributes of the plurality of attributes;
determining whether the first attribute and the second attribute corresponds to a first data category or a second data category, wherein the first data category is inaccessible via a public data source, and wherein the second data category is accessible via the public data source;
determining a first set of data corresponding to a private data source;
determining a second set of data corresponding to the public data source;
generating an assessment of image authenticity based on:
in response to determining that the first attribute corresponds to the first data category, generating a first verification of the first attribute based on the first set of data;
in response to determining that the second attribute corresponds to the second data category, generat- ing a second verification of the second attribute based on the second set of data; and determining a first weight for the first verification and a second weight for the second verification, wherein the first verification is weighed more heavily than the second verification due to the first attribute corresponding to the first data category and the second attribute corresponding to the second data category;

generating a confidence metric for the assessment based on the first weight the second weight, the first verification and the second verification; and generating a notification for display on a user device based on the assessment and the confidence metric, the notification indicating an authenticity of the image.

2. A method for determining content authenticity based on weighted analysis of categorical attributes using a machine learning model with limited training data, the method comprising:

receiving first content, wherein the first content comprises a plurality of attributes corresponding to a user;

determining, using the machine learning model, a first attribute and a second attribute of the plurality of attributes in the first content, wherein the machine learning model is configured to generate verifications for individual attributes of the plurality of attributes;

determining whether the first attribute and the second attribute corresponds to a first data category or a second data category, wherein the first data category is inaccessible via a public data source, and wherein the second data category is accessible via the public data source;

in response to determining that the first attribute corresponds to the first data category, retrieving a first set of data corresponding to the user from a private data source;

in response to determining that the second attribute corresponds to the second data category, retrieving a second set of data corresponding to the user from the public data source;

generating a first comparison of the first attribute and the first set of data;

generating a second comparison of the second attribute and the second set of data;

determining a first weight for the first comparison based on the first comparison involving the first set of data and a second weight for the second comparison involving the second set of data, wherein the first weight is greater than the second weight;

generating an assessment of authenticity of the first content based on the first weight, a first result of the first comparison, the second weight, and a second result of the second comparison; and generating a notification for display on a user device, wherein the notification comprises a result of the assessment indicating an authenticity of the first content.

3. The method of claim 2, wherein determining the first weight further comprises:

determining a first length of time required to access the first set of data; and generating the first weight based on the first length of time.

4. The method of claim 2, wherein determining the first weight further comprises:

determining a first authorization level to access the first set of data; and generating the first weight based on the first authorization level.

5. The method of claim 2, wherein determining the first weight further comprises:

generating a third comparison of the first attribute and the second set of data; and generating the first weight based on the third comparison.

6. The method of claim 2, wherein determining the first weight further comprises:

determining that the first attribute is data confirmed by the user; and generating the first weight based on determining that the first attribute is the data confirmed by the user.

7. The method of claim 2, wherein determining the first weight further comprises:

determining that the first attribute is non-human-readable data; and generating the first weight based on determining that the first attribute is non-human-readable data.

8. The method of claim 2, wherein determining the first weight further comprises:

determining that the first attribute is a two-dimensional code, wherein the two-dimensional code comprises a resource locator; and generating the first weight based on determining that the first attribute is the two-dimensional code.

9. The method of claim 2, wherein determining the first weight further comprises:

determining that the first attribute is a form of contactless technology; and generating the first weight based on determining that the first attribute is the form of contactless technology.

10. The method of claim 2, wherein determining the first weight further comprises:

determining that the first attribute is temporal data, wherein the temporal data represents a point in time; and generating the first weight based on determining that the first attribute is the temporal data.

11. The method of claim 2, wherein determining the first weight further comprises:

determining that the first attribute is non-temporal data, wherein the non-temporal data is data not associated with a point in time; and generating the first weight based on determining that the first attribute is the non-temporal data.

12. The method of claim 2, wherein generating the assessment further comprises:

determining a portion of the first content using optical character recognition;

generating an authentication value corresponding to the portion;

retrieving an authentication dataset, wherein the authentication dataset comprises a plurality of authentication values corresponding to fraudulent content; and generating the first weight based on comparing the authentication value to the authentication dataset.

13. The method of claim 2, wherein generating the assessment further comprises:

generating a confidence metric based on the first weight; and providing the confidence metric in the assessment.

14. The method of claim 13, further comprising:

determining a threshold confidence metric; and transmitting an alert to the user device when the confidence metric exceeds the threshold confidence metric.

15. The method of claim 2, further comprising:
identifying an online identifier in the plurality of attributes corresponding to the user, wherein the online identifier corresponds to digital content;
generating a plurality of extracted attributes by accessing the digital content pointed to by the online identifier corresponding to the first attribute;
comparing each attribute of the plurality of extracted attributes to the first attribute; and
updating the assessment when at least one of the plurality of extracted attributes matches the first attribute.

16. The method of claim 2, further comprising:
generating a recommended action by:
retrieving a third set of data, wherein the third set of data comprises a plurality of actions, and wherein each action of the plurality of actions in the third set of data corresponds to verifying the plurality of attributes; and
determining the recommended action of the plurality of actions corresponding to the first attribute.

17. One or more non-transitory, computer-readable media storing instructions that, when executed by one or more processors, cause operations comprising:
receiving first content, wherein the first content comprises a plurality of attributes corresponding to a user;
determining, using a first machine learning model, a first attribute and a second attribute of the plurality of attributes in the first content, wherein the first machine learning model is configured to generate verifications for individual attributes of the plurality of attributes;
determining whether the first attribute and the second attribute corresponds to a first data category or a second data category, wherein the first data category is inaccessible via a public data source, and wherein the second data category is accessible via the public data source;
in response to determining that the first attribute corresponds to the first data category, retrieving a first set of data corresponding to the user from a private data source;
in response to determining that the second attribute corresponds to the second data category, retrieving a second set of data corresponding to the user from the public data source;
generating a first comparison of the first attribute and the first set of data;
generating a second comparison of the second attribute and the second set of data;
determining a first weight for the first comparison based on the first comparison involving the first set of data and a second weight for the second comparison involfing the second set of data, wherein the first weight is greater than the second weight;
generating an assessment of authenticity of the first content based on the first weight, the first comparison, the second weight, and a second result of the second comparison; and
generating a notification for display on a user device, wherein the notification comprises a result of the assessment and a confidence metric, the result indicating an authenticity of the first content.

18. The one or more non-transitory, computer-readable media of claim 17, wherein the instructions further cause operations comprising:
determining a first length of time required to access the first set of data; and
generating the first weight based on the first length of time.

* * * * *